United States Patent [19]
Tokudome et al.

[11] 4,031,428
[45] June 21, 1977

[54] DISCHARGE TUBE HAVING MULTIPLE ELECTRODES ARRANGED IN TANDEM

[75] Inventors: Katsumi Tokudome, Iruma; Shuzo Hattori, Nagoya, both of Japan

[73] Assignee: Kimmon Electric Co., Ltd., Tokyo, Japan

[22] Filed: Mar. 15, 1976

[21] Appl. No.: 666,907

[30] Foreign Application Priority Data
Mar. 13, 1975 Japan .............................. 50-30331

[52] U.S. Cl. .............................. 315/111; 313/210; 315/337; 331/94.5 D; 331/94.5 G; 331/94.5 PE

[51] Int. Cl.² ......................................... H01S 3/22

[58] Field of Search ................ 331/94.5 D, 94.5 G, 331/94.5 PE; 315/111, 111.8, 185 R, 189, 326, 334, 337, 358; 313/210

[56] References Cited
UNITED STATES PATENTS

| | | | |
|---|---|---|---|
| 3,317,853 | 5/1967 | George | 331/94.5 D |
| 3,497,827 | 2/1970 | Smith et al. | 331/94.5 PE |
| 3,582,817 | 6/1971 | Gilson | 331/94.5 PE |
| 3,787,781 | 1/1974 | Medicus et al. | 331/94.5 G |
| 3,868,593 | 2/1975 | Fukuda et al. | 331/94.5 D |

*Primary Examiner*—Eugene R. La Roche
*Attorney, Agent, or Firm*—Flynn & Frishauf

[57] ABSTRACT

A discharge tube comprises a vessel containing rare gas; a plurality of electrodes (having a cathodic part and anodic part therein) and so arranged tandem in said vessel that a glow discharge is kept in a discharge gap between each said cathodic part and said anodic part of the preceding electrode, and that an optical path is allowed to let through each negative glow part of said glow discharge adjacent to said cathodic part; means to apply a dc voltage across every said discharge gap in series; and means to supply metal vapor to one of said glow discharge at the most low potential end of said means to apply dc voltage, whereby metal ions formed in said one of said glow discharge are carried down throughout said vessel.

7 Claims, 11 Drawing Figures

DISCHARGE TUBE HAVING MULTIPLE ELECTRODES ARRANGED IN TANDEM

BACKGROUND OF THE INVENTION

I. Field of the Invention

This invention relates generally to means for obtaining active media of gas lasers, and more particularly to discharge tubes useful for a certain class of gas laser referred to as "rare-gas-metal-vapor laser" which utilizes an excited level of singly ionized metal atoms as the upper laser level.

II. Description of Prior Art

Forms of discharge so far proposed for the active media of rare-gas-metal-vapor lasers are classified into two classes. The first class is referred to as "positive column" discharge utilizing a long positive column part of a dc glow discharge in a capillary as an active medium in which a weak axial field is sustained to keep up a necessary and sufficient electronic temperature for compensating the diffusion-determined charge loss by various ion formation processes. The positive column discharge is very stable and keeps an uniform metal ion distribution throughout the positive column by virtue of so called "cataphoresis effect" when metal vapor is introduced at the low potential end of the positive column, as shown by J. P. Goldsborough in a paper appeared in Applied Physics Letters vol. 16, pp. 159–161 (1969).

The second class is referred to as "hollow cathode" discharge utilizing a negative glow part of a dc discharge. On account of the fact that a negative glow usually is not likely to be developed into a long column, in contrast to the positive column, various structures are proposed as an efficient laser active medium.

A "coaxial hollow cathode" laser described by W. K. Schuebel in a paper appeared in IEEE Journal of Quantum Electronics vol. QE-6, pp. 574–575 (1969) has a long hollow cathode with slots in its wall and tubular anode arranged coaxially to the hollow cathode. In this case the negative glow parts near the slots develop into a long column inside the hollow cathode in a high current region as it is know as "hollow cathode effect".

A "multiple anode hollow cathode" laser described by Y. Sugawara and Y. Tokiwa in a paper appeared in Japanese Journal of Applied Physics vol. 9, pp. 588–589 (1970) and that by J. A. Piper and C. E. Webb in a paper appeared in Journal of Physics D: Applied Physics vol. 6, pp. 400–407 (1973) each has a long hollow cathode with many holes in its wall and has corresponding numbers of anodes. An array of negative glows in the hollow cathode near each hole serves as an active medium for the laser.

The hollow cathode discharge are known to work efficiently as an active medium at higher metal vapor pressure region of up to several tenths of a torr, because there is unperishable resource of high energy electrons in a negative glow supplied from a sheath surrounding the cathode. This resource is independent of metal vapor pressure, in contrast with the positive column where there is a remakable lowering of the electronic temperature at a relatively low metal vapor pressure influenced by the lowering of the axial field conditioned by increasing supply of ions by introducing metal vapor.

In accordance with the fact that the hollow cathode discharge is effective at a higher metal vapor pressure region, production of a high output power, production of spectra with much restricted excitation processes, and hard-to-be-saturable nature of a laser active media are found to be realized by rare-gas-metal-vapor laser using a hollow cathode discharge.

Regardless of such an attractive feature of the hollow cathode discharge as an active media for the rare-gas-metal-vapor lasers, it has two fatal disadvantages.

The first fatal disadvantage is that there is no efficient method to guarantee the uniform distribution of metal vapor throughout the long hollow cathode. The second fatal disadvantage is the unstable nature of the long hollow cathode discharge. A part of coaxial hollow cathode is likely to turn into an arc discharge spot in its high current operation. Whereas, currents of different anode in a "multiple anode hollow cathode" discharge is not likely to balance with each other even with high stabilizing resistance connected to each anode.

The reason why no commercially available hollow cathode laser is so far produced is quite understandable in connection with these fatal disadvantages.

SUMMARY OF THE INVENTION

It is an object of this invention is to provide a discharge tube compromising two opposite requirement, so far pursuited in different type of the discharge tube, on one hand to obtain a uniform and stable discharge and on the other hand to utilize the high laser gain of the negative glow part of a glow discharge.

The other object is to provide a discharge tube realizing a stable rare-gas-metal-vapor laser operating at a high metal vapor pressure and thus producing a high output power.

In view of fruitful results about He-Cd, He-Zn, He-As, He-$I_2$, and He-Hg lasers using hollow cathode discharge, this invention will surely contribute to produce a useful series of practical lasers covering near infrared to near ultraviolet spectral range.

This invention is based on a discovery that said two fatal disadvantages are overcome all at once with use of multiple hollow cathodes as well as multiple anodes connected tandem with each other. An array of negative glows in hollow cathodes preserves the advantage of high metal vapor pressure operation. An average axial field produced by the tandem connection of multiple electrodes preserves the advantage of the cataphoresis effect to guarantee the uniform distribution of metal ions. The tandem connection of electrodes also prevents the selective growth of the electron density in the negative glow part in any particular hollow cathode. Thus, the basic configuration of a discharge tube according to the invention comprises multiple hollow cathode and multiple anode connected tandem with each other.

Further and more effective stabilization is achieved by modifying the basic configuration of the invention to take the stable nature of a discharge into account.

The first modification of the basic configuration of the invention is to use axial ac fields superposed on the dc fields alternatively in opposite phase for the sequence of electrodes. As the consequence, alternatively one half of the negative glow parts has high electron density in a half period of ac voltage source and so does the other half in the other half period of ac voltage source.

The second modification of the basic configuration of the invention is to use even number of subdivided cathode to each of which ac field is applied alternatively in opposite phase for the sequence of subdivided electrodes.

BRIEF DESCRIPTION OF THE DRAWING

FIGS. 5($a$) and 5($b$) are schematic sectional views showing a fifth embodiment of the basic configuration of the invention, in which embodiment the anodes and ceramic joints connecting them constitute a vessel for discharge gas;

FIGS. 7($a$) and 7($b$) are schematic sectional views showing a first embodiment of the second modification of the invention, in which embodiment an ac voltage is applied to subdivided electrodes with alternative phase for the sequence of subdivided electrodes around an axis along which electrodes are aligned; and FIGS. 8($a$) and 8($b$) are schematic sectional views showing a second embodiment of the second modification of the invention, in which embodiment the subdivided electrodes constitutes a "rising sun" type cavity similar to that used for a magnetron to be compatible with the microwave excitation of the discharge.

DETAILED DESCRIPTION OF THE PREFERRED EMBODIMENTS

Figure 1:
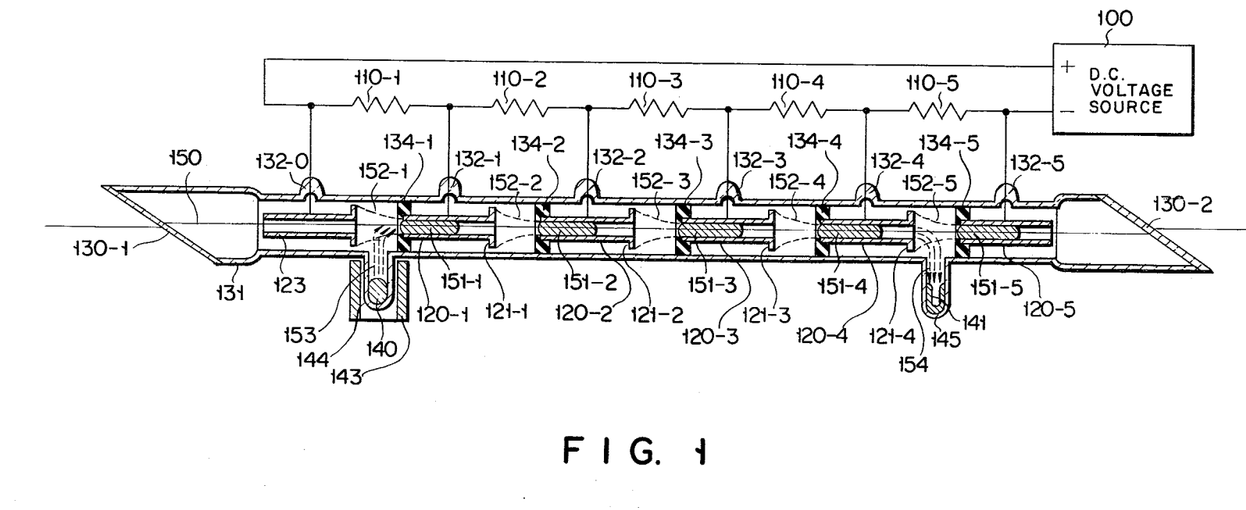
FIG. 1 is a schematic sectional view showing a first embodiment of the basic configuration of the invention, in which embodiment the anodic part is a flat disk.

Referring to FIG. 1, the first embodiment of the invention, in which embodiment the anodic part is a flat disk, is explained in the following:

An output voltage of a dc voltage source 100 of around 2000 volts is divided into five parts by voltage dividing resistances 110-1, 110-2, 110-3, 110-4 and 110-5 and applied to discharge gap between a predischarge anode 123 and a hollow cathodic part 120-1, to that between a disk anodic part 121-1 and a hollow cathodic part 120-2, to that between a disk anodic part 121-2 and a hollow cathodic part 120-3, to that between a disk anodic part 121-3 and a hollow cathodic part 120-4, and to that between a disk anodic part 121-4 and a hollow cathode 120-5, respectively through electrode seals 132-0, 132-1, 132-2, 132-3, 132-4 and 132-5. Each of the disk anodic part 121-1 and the hollow cathodic part 120-1, the disk anodic part 121-2 and the hollow cathodic part 120-2, the disk anodic part 121-3 and the hollow cathodic part 120-3, and disk anodic part 121-4 and the hollow cathodic part 120-4 is a part of an electrode and is kept at the same potential.

In a discharge gas vessel 131 helium gas of about 10 torr is contained. On application of a dc voltage across the voltage dividing resistance 110-1, dc discharge starts in an area shown by dotted line 152-1 between the predischarge anode 123 and the hollow cathodic part 120-1. A ceramic cathode protector 134-1 serves to prevent sputtering of the edge of the hollow cathodic part 120-1. A negative glow art shown by a shaded area 151-1 develops inside the hollow cathodic part 120-1. A metal source 140 contained in a source side-arm 144 is heated by an oven 143. Temperature of the metal source 140 is so controlled as to give a metal vapor flow which produces an optimum metal ion density at the negative glow part 151-1 when it is pumped into the negative glow part by the cataphoresis effect in front of the hollow cathodic part 120-1. The metal vapor flow from the metal source 140 is shown by arrowed dotted line 153. The negative glow part 151-1 converts to a high gain laser active medium with controlled metal vapor flow into it.

The disk anodic part 121-1, the hollow cathodic part 120-2, a ceramic cathode protector 134-2, a negative glow part 151-2, and discharge area 152-2 have similar functions and similar mutual relations as the corresponding parts explained in the preceding paragraph. In this case, metal vapor flow from the hollow cathodic part 120-1 takes over the roll of metal vapor flow from the metal source 140, but still the flow rate is controlled as like as that from the metal source 140, as the consequence of a similar cataphoresis effect in front of the hollow cathodic part 120-2. For this reason the density ratio of helium ion to metal ion in the negative glow part 151-2 is kept as similar as possible to that in the negative glow part 151-1. The discharge current density in the negative glow part 151-2 is also kept as similar as possible to that in the negative glow part 151-1 by choosing the voltage dividing resistances 110-1 and 110-2 sufficiently large as to have it granted that the current flowing in these resistances are far smaller than that of discharge current of around 1 ampere.

The same explanation holds for two stages of discharge gaps following the gap between the disk anodic part 121-1 and the hollow cathodic part 120-2. The explanation for the discharge between the disk anodic part 121-4 and the hollow cathode 120-5 is quite different. A metal sink side-arm 145 is cooled sufficiently to make its inner wall act efficiently as a metal sink 141. metal vapor in the discharge area 152-5 flow into the metal sink side-arm to deposit on the metal sink 141 as shown by arrowed dotted lines 154. Consequently, a negative glow part 151-5 is no more a laser active medium.

All of the negative glow parts 151-1, 151-2, 151-3 and 151-4 having a high laser gain are aligned on an optical path 150, which is coupled to an appropriate laser cavity through Brewster windows 130-1 and 130-2.

Figure 2:
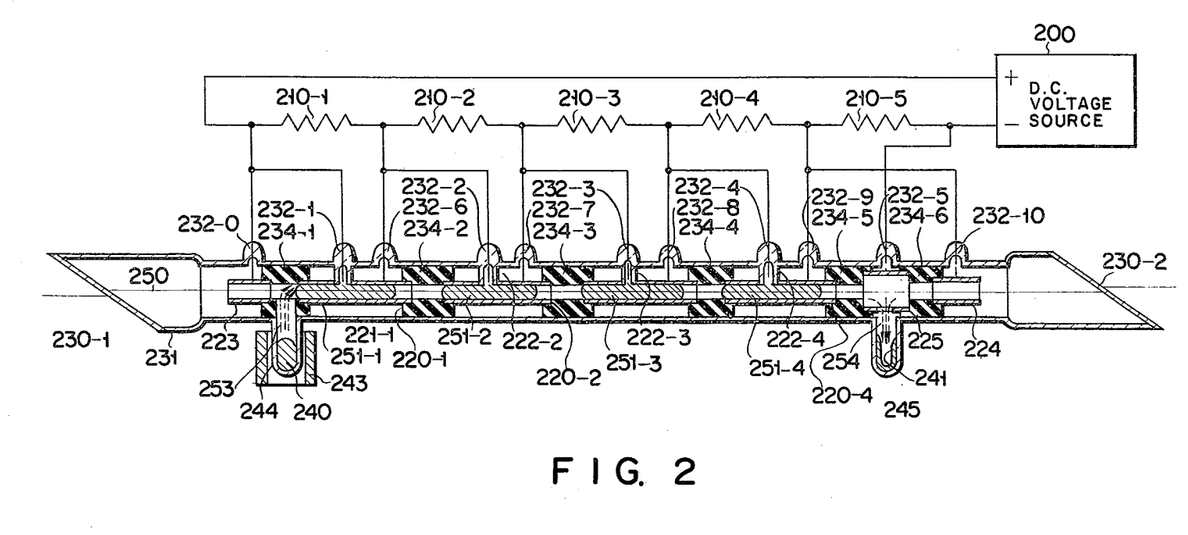
FIG. 2 is a schematic sectional view showing a second embodiment of the basic configuration of the invention, in which embodiment the anodic part is a pin placed near hole on a wall of a hollow cathode.

Referring to FIG. 2, the second embodiment of the basic configuration of the invention, in which embodiment the anodic part is a pin placed near a hole on a wall of a hollow cathode is explained in the following:

An output voltage of a dc voltage source 200 of around 2000 volts is divided into five parts by voltage dividing resistances 210-1, 210-2, 210-3, 210-4 and 210-5. First four of these divided voltages are applied to a discharge gaps between a pin anode 222-1 and a hollow cathode 220-1, to that between a pin anode 222-2 and a hollow cathode 220-2, to that between a pin anode 222-3 and a hollow cathode 220-3 and to that between a pin anode 222-4 and a hollow cathode 220-4 respectively through electrode seals 232-1 and 232-6, 232-2 and 232-7, 232-3 and 232-8, and then 232-4 and 232-9.

These five divided voltages are also applied to discharge gaps between a predischarge anode 223 and the hollow cathode 220-1, to that between the hollow cathode 220-1 and the hollow cathode 220-2, to that between the hollow cathode 220-2 and the hollow cathode 220-3, to that between the hollow cathode 22 220-3 and the hollow cathode 220-4, and to that between hollow cathode 220-4 and an ion collecting cathode 225.

In a discharge vessel 231 helium gas of about 10 torr is contained. On application of the dc voltage across the voltage dividing resistance 210-1 dc discharge starts in the discharge gap between the hollow cathode 220-1 and the pin anode 222-1 placed a little outside a hole on a side wall of the hollow cathode 220-1. A direct discharge between the hole edge and the pin anode is prevented by a ceramic tube inserted into the hole. Thus a steady negative glow part shown by a shaded area 251-1 develops inside the hollow cathode 220-1. A less intense discharge starts in the discharge gap between the predischarge anode 223 and the hollow cathode 220-1. A metal source 240 contained in a source side-arm 244 is heated by an oven 243. Temperature of the metal source 240 is so controlled as to give a metal vapor flow which gives an optimum metal ion density at the negative glow part 251-1 when it is pumped into the negative glow part 251-1 by the cataphoresis effect in front of the hollow cathode 220-1. A ceramic cathode protector 234-1 serves to prevent sputtering of the edge of the hollow cathode 220-1.

The hollow cathode 220-2, the pin anode 222-2, a negative glow part 251-2, the hollow cathode 220-1 and a ceramic cathode protector have similar functions and mutual relations about a discharge between the hollow cathode 220-2 and the pin anode 222-2 and another discharge between the hollow cathode 220-2 and the hollow cathode 220-1. In this case, metal vapor flow from the hollow cathode 220-1 takes over the roll of metal vapor flow from the metal source 240, but still the flow rate is controlled as like as that from the metal source 240 as the consequence of a similar cataphoresis effect in front of the hollow cathode 220-2. For this reason the density ratio of helium ion to metal ion in the negative flow part 251-2 is kept as similar as that in the negative glow part 251-1. The discharge current density in the negative glow part 151-2 is also kept as similar as that in the negative glow part 151-1 by choosing the voltage dividing resistance 210-1 and 210-2 sufficiently large as to have it granted that the current flowing in these resistances are far smaller than that of the discharge current of 1 ampere.

The same explanation holds for two stages of discharge following between hollow cathode 220-2 and the pin anode 222-2 and another discharge between the hollow cathode 220-2 and the hollow cathode 220-1. A dc voltage across the voltage dividing resistance 210-5 is applied to the discharge gap between the hollow cathode 220-4 and an ion collecting cathode 225 and thereby causing metal ion to flow into the latter by a cataphoresis effect. A metal sink side-arm 245 is cooled sufficiently to make its inner wall act as a metal sink 241. Metal vapor inside the ion collecting cathode 225 flows into the metal sink side-arm to diposit on the metal sink 241 as shown by arrowed dotted line 254. A voltage across the voltage dividing resistance 210-5 is also applied to the gap between a reflecting anode 224 and the ion collecting cathode 225 to prevent the metal ion from flowing onto a Brewster window 230-2. Ceramic cathode protectors 234-5 and 234-6 serve to prevent sputtering of the edge of the ion collecting cathode 225.

All of the negative glow parts 251-1, 251-2, 251-3, and 251-4 having a high laser gain are aligned on an optical path 250, which is coupled to an appropriate laser cavity through Brewster windows 230-1 and 230-2.

Figure 3:
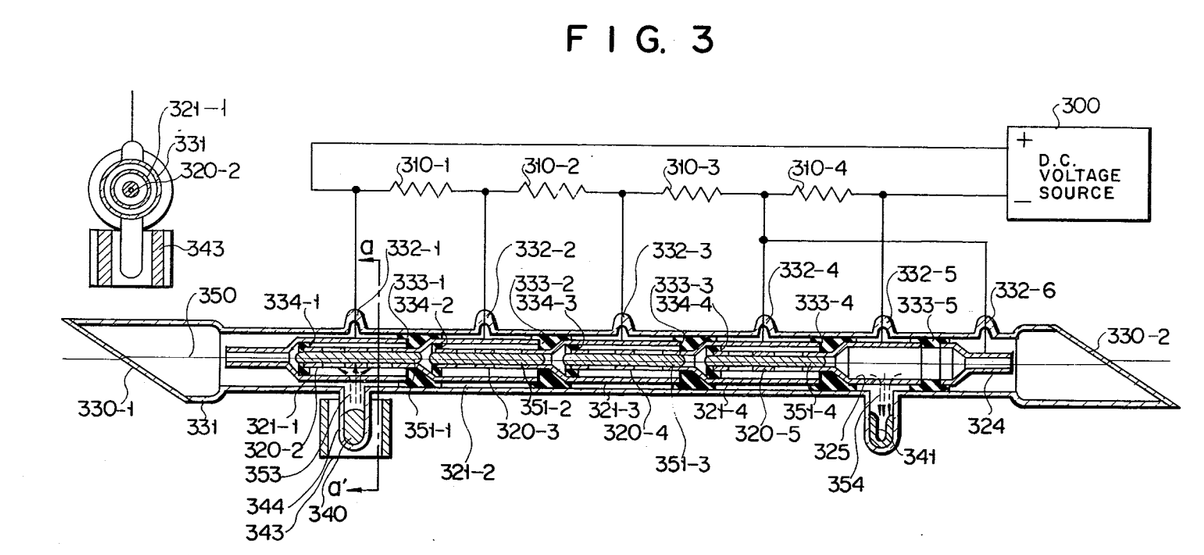
FIG. 3 is a schematic sectional view showing a third embodiment of the basic configuration of the invention, in which embodiment the anodic part is a hollow tube placed coaxial to a slotted hollow cathode.

Referring to FIG. 3, the third embodiment of the basic configuration of the invention, in which the anodic part is a hollow tube placed coaxial to slotted hollow cathode, is explained in the following:

An output voltage of a dc voltage source 300 of around 1600 volts is divided into four parts by voltage dividing resistances 310-1, 310-2, 310-3 and 310-4 and applied to discharge gaps between an anodic part 321-1 and a hollow cathodic part 320-2, to that between an anodic part 321-2 and a hollow cathodic part 320-3, to that between an anodic part 321-3 and a hollow cathodic part 320-4, and to that between an anodic part 321-4 and a hollow cathodic part 320-5, respectively through electrode seals 332-1, 332-2, 332-3, 332-4 and 332-5 respectively. Each of the hollow cathodic part 320-2 and the coaxial anodic part 321-2, the hollow cathodic part 320-3 and the coaxial anodic part 321-3, the hollow cathodic part 320-4 and the coaxial anodic part 321-4, and the hollow cathodic part 320-5 and an ion collecting cathode 325 is a part of an electrode and kept at a same potential. In a discharge gas vessel 331, helium gas of about 10 torr is contained. On the application of the dc voltage across the voltage dividing resistance 310-1 a dc discharge starts in the discharge gap between the hollow cathodic part 320-2 and the anodic part 321-1 which is a hollow tube placed coaxial to a slotted hollow cathodic part 320-2. A ceramic cathode protector 334-1 serves to prevent sputtering of the edge of the hollow cathodic part 320-2, and a ceramic insulator 333-1 serves to keep the coaxiality of the anodic part 321-1 to the hollow cathodic part 320-2. A steady negative glow part shown by a shaded area 351-1 develops inside the hollow cathodic part 320-2. A metal source 340 contained in a source side-arm 344 is heated by an oven 343. Temperature of the metal source 340 is so controlled as to give a metal vapor flow which produces an optimum metal ion density at the negative glow part 351-1 when it is pumped into the negative glow part by the cataphoresis effect through the slot on the wall of the hollow cathodic part 320-2. Metal vapor flow from the metal source 340 is shown by arrowed dotted lines 353. The negative glow part 351-1 converts to a high gain laser active medium with controlled metal vapor flowing into it.

The coaxial anodic part 321-2, the slotted hollow cathodic part 321-3, a ceramic cathode protector 334-2, a ceramic insulator 333-2, and a negative glow part 351-2; and also corresponding parts in the following two stages of discharge; have similar function and mutual relations as the corresponding parts in the preceding paragraphs. In these case metal vapor flow from the hollow cathodic part of the former stage takes over the roll of the metal vapor flow from the metal source 340, but still the flow rate is controlled as like as that from the metal source 340, as the consequence of a similar cataphoresis effect in a less intence discharge between hollow cathodic parts of adjacent stages. For this reason the density ratio of helium ion to metal ion in the negative glow part of each these stages is kept similar to that in the negative glow part 351-1. The discharge current density in each negative glow part is also kept similar as that in the negative glow part 351-1 by choosing the voltage dividing resistances 310-1 to 310-4 sufficiently large as to have it granted that the current flowing these resistances are far smaller than that of discharge current of 1 ampere.

A metal sink side-arm 345 cooled sufficiently to make its inner wall act as a metal sink 341. Metal vapor flow into the ion collecting cathode 425 flows into the metal sink side-arm 345 to deposit on the metal sink 341 as shown by arrowed dotted lines 154. The voltage across the voltage dividing resistance 310-4 is also applied to the gap between a reflecting anode 324 and the ion collecting cathode 325 to prevent the metal ion flow onto a Brewster window 330-2. A ceramic insulator 333-5 serves to prevent sputtering of the edge of the ion collecting cathode 325.

All of the negative glow parts 351-1, 351-2, 351-3 and 351-4 having a high laser gain are aligned on an optical path 350, which is coupled to an appropriate laser cavity through Brewster windows 330-1 and 330-2.

Figure 4:
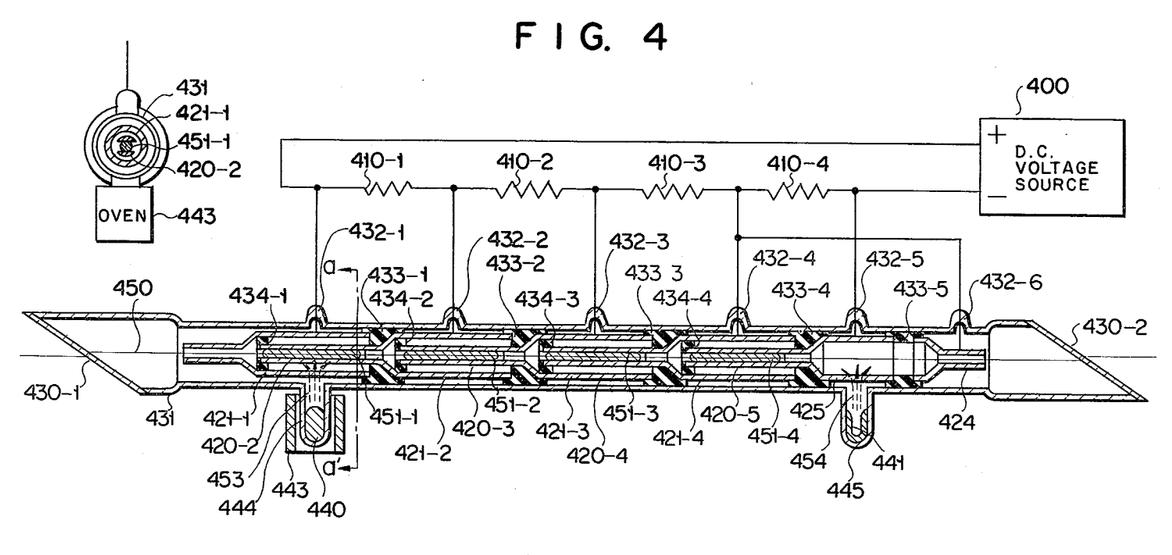
FIG. 4 is a schematic sectional view showing a fourth embodiment of the basic configuration of the invention, in which embodiment the anodic part is a hollow tube placed outside of a parallel plate cathode.

Referring to FIG. 4, the fourth embodiment of the basic configuration of the invention, in which the anodic part is a hollow tube placed outside of a parallel plate cathode, is explained in the following:

The only difference between the embodiment shown in FIG. 4 and that in FIG. 3 is that parallel plate cathode parts are used in place of the slotted hollow cathode parts.

It is known that electron density concentrates to a most narrow part of the cathode in a high discharge current region. If one intends to choose a fine bore for a slotted hollow cathode, a high electron density part appears once in a while at the slot rather than at the center of hollow cathode part. By using parallel plate cathode, the high electron density part, for instance that denoted as 451-1 in a-a section of FIG. 4, occur at the center part of the parallel plate cathodic part 420-2. Use of the parallel plate cathode 420-2, 420-3, 420-4 and 420-5 enables us to realize a really narrow cathode structure which is efficient at high current density and at high helium pressure, and thus to realize a negative glow parts 451-1, 451-2, 451-3 and 451-4 having high laser gain all aligned on an optical path 450.

Figures 5A, 5B:
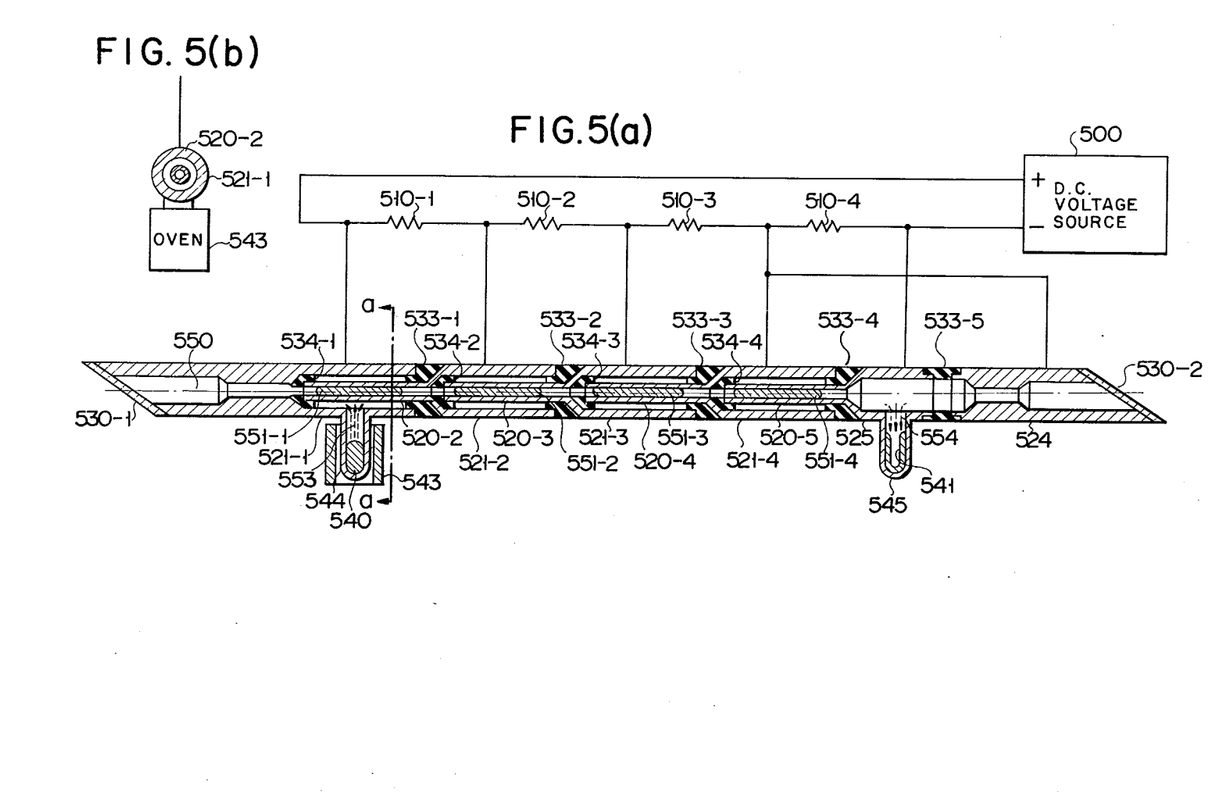

Referring to FIGS. 5(a) and 5(b), the fifth embodiment of the basic configuration of the invention, in which the anodes and ceramic joints connecting them constitutes a vessel for discharge gas, is explained in the following:

A coaxial anodic parts 521-1, 521-2, 521-3 and 521-4, ion collecting cathode 525 and reflecting anode 524 is connected one after another by ceramic insulators 533-1, 533-2, 533-3, 533-4 and 533-5 to make a tube. With Brewster windows 540-1 and 540-2 cemented at the both ends, the tube makes a discharge gas vessel. The other parts have similar functions and mutual relations as the corresponding parts in FIG. 4.

Figure 6:
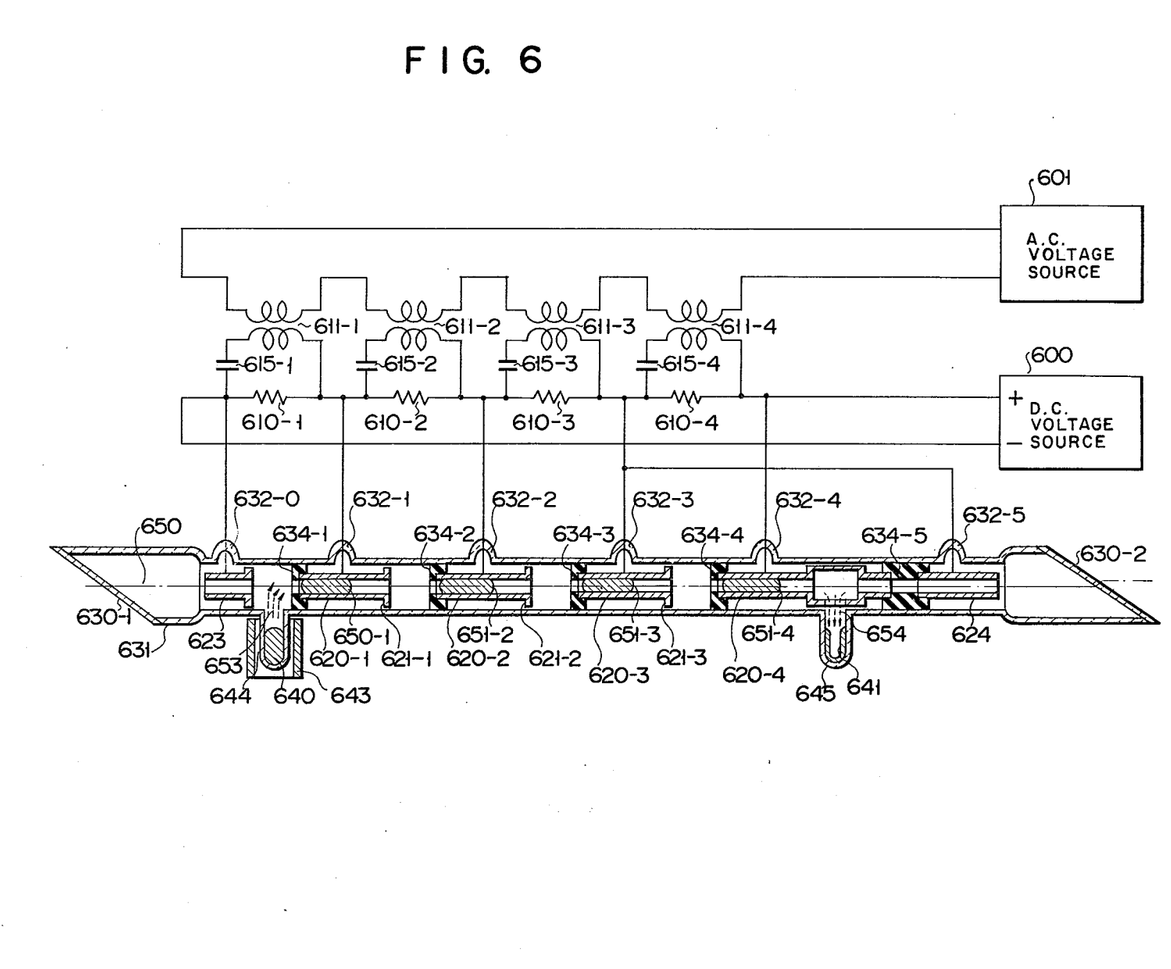
FIG. 6 is a schematic sectional view showing an embodiment of the first modification of the invention, in which embodiment ac voltages are superposed on the dc voltage between electrodes with alternative phase for the sequence of electrodes.

Referring to FIG. 6, an embodiment of the first modification of the invention, in which an ac voltage is superposed on the dc voltage between electrodes with alternative phase for the sequence of electrodes, is explained in the following:

An output voltage of a dc voltage source 600 of around 1600 volts is divided into four parts by voltage dividing resistances 610-1, 610-2, 610-3 and 610-4 to each of which parts output voltage of an ac voltage source 601 (of about 800 volts peak to peak and with frequency of 30 mega hertz) is superposed alternatively in opposite phase through mutual inductance 611-1 and capacitance 615-1, mutual inductance 611-2 and capacitance 615-2, mutual inductance 611-3 and capacitance 615-3, and mutual inductance 611-4 and capacitance 615-4 respectively.

In a discharge gas vessel 631 helium gas of about 10 torr is contained. On application of the voltage across the voltage dividing resistance 610-1, a ripple voltage from zero to 800 volts as the results of said superposition, to a discharge gap between disk anode 623 and a hollow cathodic part 620-1 through electrode seals 623-0 and 623-1, a ripple discharge starts in this gap. A ceramic cathode protector 634-1 serves to prevent sputtering of the edge of the hollow cathodic part 620-1. A negative glow part shown by shaded area 651-1 develops inside the hollow cathodic part 620-1 and the electron density of the negative glow part 620-1 changes with said ripple voltage. A metal source 640 contained in a source side-arm 644 is heated by an oven 643. Temperature of the metal source 640 is so controlled as to give a metal vapor flow which produces an optimum average metal ion density at the negative glow part when it is pumped into the negative glow part by the cataphoresis effect in front of the hollow cathodic part 620-1. In this case the cataphoresis effect corresponds to the dc part of the discharge current because of the high frequency of its ac part to which ionic current is not responding. The metal vapor flow from the metal source 640 is shown by arrowed dotted lines 653. The negative glow part 651-1 converts to a high gain laser active medium corresponding to the average electron density. The laser gain exhibits only a little ripple factor because the period of ac excitation is choosed far less than the lifetime of metastable excited species responsible to the laser upper level such as helium ion and helium b 3s metastable.

The disk anodic part 621-1, the hollow cathodic part 620-2, a ceramic cathode protector 634-2, and a negative glow part 651-2 have similar functions and similar mutual relations as the corresponding parts explained in the preceding paragraph. In this case, metal vapor flow from the hollow cathodic part 620-1 takes over the roll of metal vapor flow from the metal source 640, but still the flow rate is controlled as like as that from the metal source 640, as the consequence of a similar cataphoresis effect in front of the hollow cathodic part 620-2. For this reason, the density ratio of helium ion to metal ion in the negative glow part 651-2 is kept as similar as that in the negative glow part 651-1. The dc part of the discharge current density in the negative glow part 651-2 is also kept as similar as that in the negative glow part 651-1 by choosing the voltage dividing resistances 610-1 and 610-2 sufficiently large as to have it granted that the current flowing in these resistances are far smaller than that of dc part of the discharge current of 1 ampere.

The same explanation holds for two stages of discharge gaps following the gap between disk anodic part 621-1 and the hollow cathodic part 620-2. A metal sink side-arm 645 is cooled sufficiently to make its inner wall act as a metal sink 641. Metal vapor in a negative glow part 651-4 flows into the metal sink side-arm 645 to deposit on the metal sink 641 as shown by arrowed dotted lines 654. A dc voltage across the voltage dividing resistance 610-4 is also applied to the gap between a reflecting anode 624 and the hollow cathodic part 620-4 to prevent the metal ion from flowing onto a Brewster window 630-2. A ceramic cathode protector 634-5 serves to prevent sputtering of the edge of the electrodes.

All of the negative glow parts 651-1, 651-2, 651-3 and 651-4 having a high laser gain are aligned on an optical path 650, which is coupled to an appropriate laser cavity through Brewster windows 630-1 and 630-2. The remaining ripple part of the laser gain in the negative glow part 651-1 and 651-2, as well as that in the negative glow part 651-3 and 651-4, occur in the opposite phase with each other and almost cancels out.

Figures 7A, 7B:
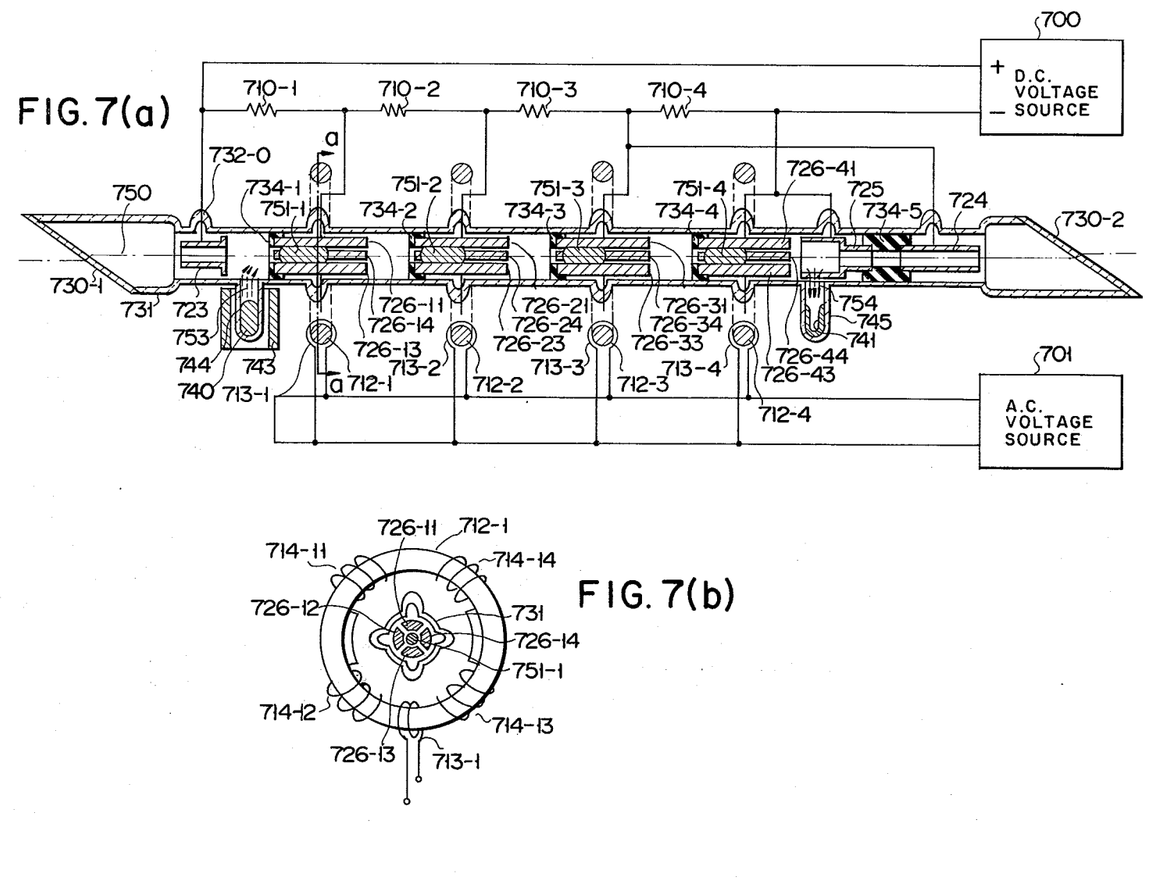

Referring to FIGS. 7(a) and 7(b), a first embodiment of the second modification of the invention, in which an ac voltages are applied to subdivided electrodes around an axis along which electrodes are aligned, is explained in the following:

An output voltage of a dc voltage source 700 of around 1600 volts is divided into four parts by voltage dividing resistances 710-1, 710-2, 710-3 and 710-4 and applied to dc discharge gaps between a predischarge anode 723 and subdivided electrodes 726-11 to 726-21, that between subdivided electrodes 726-21 and 726-31, that between subdivided electrodes 726-31 and 726-41. Subdivided electrodes 726-11 to 726-14, 726-21 to 726-24, 726-31 to 726-34 and 726-41 to 726-44 are connected to be kept at an equal potential by secondary coils 714-11 to 714-14, 714-21 to 714-24, 714-31 to 714-34 and 714-41 to 714-44 respectively.

In a discharge gas vessel 731 helium gas of about 10 torr is contained. On application of the voltage across the voltage dividing resistance 710-1, a dc discharge starts in the discharge gap between the predischarge anode 723 and subdivided electrodes 726-11 to 726-14. A ceramic cathode protector 734-1 serves to prevent sputtering of the subdivided electrodes. A negative glow part 751-1 shown by shaded area develops inside a cylindrical space surrounded by the subdivided electrodes 726-11 to 726-14. An output voltage of an ac voltage source 701 of 30 mega hertz is applied to a primary coil 713-1 and an ac voltage of about 200 volts is applied to gaps between subdivided electrodes 726-11 and 726-12, that between 726-12 and 726-13, that between 726-13 and 726-14 and that between 726-14 and 726-11, through the secondary coils 714-11, 714-12, 714-13 and 714-14 respectively alternatively in opposite phase.

This ac voltage excites the negative glow part 751-1 to produce a high electron density in it.

The same explanation holds for following each three stages of dc discharge gaps. The down stream end of the set of subdivided electrodes of the preceding stage act as an anode. Whereas, a negative glow parts 751-2, 751-3 and 751-4 develop inside a cylindrical space surounding the set of subdivided electrodes of each stage. The negative glow part of each dc discharge stage is excited by ac voltage applied to gaps between each adjacent subdivided electrodes of the stage and has the electron density enhanced.

A metal source 740 contained in a source side-arm 744 is heated by an oven 743. Temperature of the metal source 740 is so controlled as to give a metal vapor flow which produces an optimum metal ion density at the negative glow parts 751-1 to 751-4 when it is pumped into the negative glow parts by the cataphoresis effect of the discharge of each dc discharge stage. The metal vapor flow from the metal source 740 is shown by arrowed dotted lines 753. The negative glow parts of each stage convert to high gain laser active media corresponding to the enchanced electron density.

A metal sink side-arm 745 is cooled sufficiently to make its inner wall act as a metal sink 741. Metal vapor in a negative glow part 751-4 flows into the metal sink side-arm to deposit on metal sink 741 as shown by arrowed dotted lines 754. A dc voltage across the voltage dividing resistances 710-4 is also applied to the gap between a reflecting anode 724 and the ion collecting cathode 725 at a same dc potential with the set of subdivided electrodes 726-41 to 726-44 to prevent the metal ion from flowing onto a Brewster window 730-2. A ceramic cathode protector 734-5 serves to prevent sputtering of the edge of the electrodes.

All of the negative glow parts 751-1, 751-2, 751-3 and 751-4 having a high laser gain are aligned on an optical path 750, which is coupled to an appropriate laser cavity through Brewster windows 730-1 and 730-2.

Figures 8A, 8B:
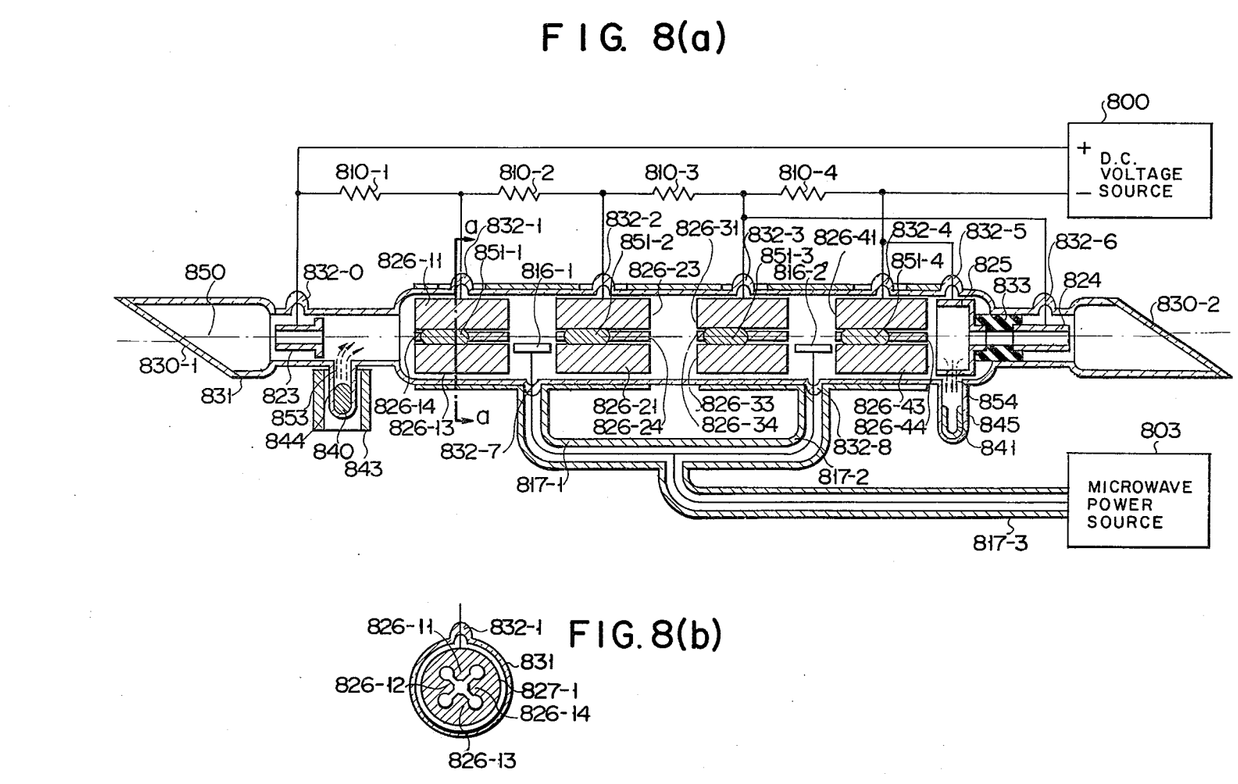

Referring to FIGS. 8(a) and 8(b), a second embodiment of the second modification of the invention, in which the subdivided electrodes constitute a "rising sun" type cavity similar to that used for a magnetron to be compatible with the microwave excitation of the discharge, is explained in the following:

An output voltage of a dc voltage source 800 of about 1600 volts is divided into four parts by voltage dividing resistances 810-1, 810-2, 810-3 and 810-4 and applied to dc discharge gaps between a predischarge anode 823 and a rising sun electrode 827-1 and 827-2, that between the rising sun electrode 827-2 and 827-3 and that between the rising sun electrode 827-3 and 827-4, respectively through electrode seals 832-0, 832-1, 832-2, 832-3 and 832-4.

In a discharge gas vessel 831 helium gas of about 10 torr is contained. On application of the voltage across the voltage dividing resistances 810-1, 810-2, 810-3 and 810-4, dc discharges start in these discharge gap. As shown in a-a section of FIG. 8, the rising sun electrode, 827-1 for instance, has four subdivided electrodes 826-11 to 826-14. Between each subdivided electrode there is a cylindrical space. An inductance determined by a magnetic flux through this cylindrical space and capacitance between subdivided electrodes constitute a resonant circuit. The resonance frequency of the resonance circuit is chosen to be about 2.45 giga hertz. Surrounded by four subdivided electrodes 826-11 to 826-14, there is another central cylindrical space where a negative glow part 851-1 shown by shaded area develops on the start of the dc discharge. j An output power of a microwave power source 803 of 2.45 giga hertz is transmitted through a coaxial cable 817-3, is divided into two parts and supplied to coupling electrodes 816-1 and 816-2 through coaxial cables 817-1 and 817-2 and electrode seals 832-7 and 832-8 respectively. A microwave voltage is excited on each subdivided electrodes of each rising sun electrode through capacitive coupling from coupling electrodes 827-1 and 827-2, and through the coupled resonance nature of resonant circuits in a rising sun electrode. These microwave fields serve to enhance electron density in each negative glow part 851-1 and 851-2.

A metal souce 840, a source side-arm 844, an oven 843, a metal sink side-arm 845, a metal sink 841, metal vapor flow 853 and 854, an ion collecting anode 825 and a reflecting cathode 824 have functions and mutual relations similar to the corresponding part explained referring to FIG. 7.

With controlled and homogeneous metal vapor flow into negative glow parts 851-1, 851-2, 851-3 and 851-4, they convert to high gain laser active media. They are all aligned on an optical path 850, which is coupled to an appropriate laser cavity through Brewster windows 830-1 and 830-2.

As will be understood from th detailed description of the preferred embodiments, it is realized according to the present invention to satisfy two opposite requirements to obtain a uniform and stable discharge with the optimum metal ion density and to utilize the high laser gain in the negative glow part of a glow discharge.

What we claim is:
1. A discharge tube comprising:
    a vessel containing rare gas;
    a plurality of electrodes having a cathodic part and anodic part therein and so arranged tandem in said vessel that a glow discharge is kept in a discharge gap between each said cathodic part and said anodic part of the preceding electrode, and that an optical path is provided to let through each negative glow part of said glow discharge adjacent to said cathodic part;
    means to apply a dc voltage across every said discharge gap in series; and
    means to supply metal vapor to one of said glow discharge at the most low potential end of said means to apply dc voltage, whereby metal ions formed in said one of said glow discharge are carried down throughout said vessel.

2. A discharge tube as claimed in claim 1, wherein said cathodic part of each said electrode comprises a hollow tube coaxial to said optical path and said anodic part comprises a pin having its one end near a hole on a side wall of said hollow tubular anodic part of the preceding electrode.

3. A discharge tube as claimed in claim 1, wherein said cathodic part of each said electrode comprises a slotted hollow tube coaxial to said optical path and said anodic part comprises a hollow tube placed coaxial to said slotted hollow tubular cathodic part of the preceding electrode.

4. A discharge tube as claimed in claim 1, wherein said cathodic part of each said electrode comprises a narrow parallel plate placed symmetrical to said optical path and said anodic part comprises a hollow tube surrounding said parallel plate-like cathodic part of the preceding electrode.

5. A discharge tube as claimed in claim 3, wherein said vessel comprises said hollow tubular anodic part jointed one after another with ceramic insulating tubes.

6. A discharge tube as claimed in claim 1 which includes means to superpose an ac voltage on said dc voltage to make a non-negative ripple electrode voltage.

7. A discharge tube as claimed in claim 1, wherein said cathodic part of each electrode comprises a plurality of subdivided electrodes symmetrically arranged around said optical path; and further comprising means to apply ac voltage to each said subdivided electrode.

* * * * *